(12) United States Patent
Ahn et al.

(10) Patent No.: US 11,168,212 B2
(45) Date of Patent: Nov. 9, 2021

(54) COMPOSITION FOR FORMING HARD COATING LAYER, METHOD OF PREPARING HARD COATING FILM AND HARD COATING FILM PREPARED BY USING THE SAME

(71) Applicants: SK Innovation Co., Ltd., Seoul (KR); SK IE Technology Co., Ltd., Seoul (KR)

(72) Inventors: Jong Nam Ahn, Daejeon (KR); Byoung Sun Ko, Daejeon (KR); Tae Sug Jang, Daejeon (KR); Jin Su Park, Daejeon (KR); Ho Chul Yoon, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 39 days.

(21) Appl. No.: 16/531,451

(22) Filed: Aug. 5, 2019

(65) Prior Publication Data
US 2020/0048462 A1 Feb. 13, 2020

(30) Foreign Application Priority Data

Aug. 7, 2018 (KR) .................. 10-2018-0092000
Jul. 30, 2019 (KR) .................. 10-2019-0092314

(51) Int. Cl.
| C08L 83/06 | (2006.01) |
| C08K 5/00 | (2006.01) |
| C09D 5/26 | (2006.01) |
| C08K 5/375 | (2006.01) |
| C08K 5/1515 | (2006.01) |
| C08J 3/28 | (2006.01) |
| C09D 183/06 | (2006.01) |

(52) U.S. Cl.
CPC .............. *C08L 83/06* (2013.01); *C08J 3/28* (2013.01); *C08K 5/0025* (2013.01); *C08K 5/1515* (2013.01); *C08K 5/375* (2013.01); *C09D 5/26* (2013.01); *C09D 183/06* (2013.01)

(58) Field of Classification Search
CPC ....... C08L 83/06; C08K 5/0025; C08K 5/375; C08K 5/1515; C08J 3/28; C08J 2483/06; C08J 2379/08; C08J 7/046; C08J 7/0427; C09D 5/26; C09D 183/06; C09D 183/00; C09D 7/63; C08G 77/14; G02B 1/14
See application file for complete search history.

(56) References Cited

U.S. PATENT DOCUMENTS

| 5,331,068 A * | 7/1994 | Blyakhman .......... C08G 59/184 |
| | | 525/504 |
| 9,354,518 B2 | 5/2016 | Bujalski et al. |
| 9,706,649 B2 | 7/2017 | Jung et al. |
| 10,377,919 B2 | 8/2019 | Bae et al. |
| 2010/0063221 A1 * | 3/2010 | Manabe ................. C08G 77/04 |
| | | 525/474 |
| 2017/0324059 A1 * | 11/2017 | Choi ...................... B32B 27/08 |

FOREIGN PATENT DOCUMENTS

| KR | 1020130074167 A | 7/2013 |
| KR | 101546729 B1 | 8/2015 |
| KR | 1020160057221 A | 5/2016 |
| KR | 101804344 B1 | 12/2017 |

OTHER PUBLICATIONS

"DC Chemicals" (SanAid SI-60) (No date).*

* cited by examiner

*Primary Examiner* — Jessica M Roswell
(74) *Attorney, Agent, or Firm* — The Webb Law Firm

(57) ABSTRACT

Provided is a composition for forming a hard coating layer, which includes an epoxy siloxane resin, a crosslinking agent including a compound having an alicyclic epoxy group, a thermal initiator including a compound represented by Chemical Formula 2, and a photoinitiator to decrease curls and increase hardness of the hard coating film.

16 Claims, 2 Drawing Sheets

COMPOSITION FOR FORMING HARD COATING LAYER, METHOD OF PREPARING HARD COATING FILM AND HARD COATING FILM PREPARED BY USING THE SAME

CROSS-REFERENCE TO RELATED APPLICATIONS

This application claims priority to Korean Patent Application No. 10-2018-0092000 filed Aug. 7, 2018 and Korean Patent Application No. 10-2019-0092314 filed Jul. 30, 2019, the disclosures of which are incorporated herein by reference in their entirety.

TECHNICAL FIELD

The following disclosure relates to a composition for forming a hard coating layer, a preparation method of a hard coating film, and a hard coating film prepared using the same.

BACKGROUND

Recently, thin displays using a flat panel display such as an organic light emitting diode display or a liquid crystal display are drawing attention. Particularly, these thin displays are implemented in the form of a touch screen panel and are widely used in various smart devices characterized by portability including various wearable devices as well as smart phones and tablet PCs.

These portable touch screen panel-based displays are provided with a window cover for display protection on a display panel for protecting the display panel from scratches or external impact, and in most cases, tempered glass for a display is used as a window cover. A tempered glass for a display is thinner than general glass, but is characterized by being manufactured to have high strength together with resistance to scratches.

However, the tempered glass has a disadvantage of being not suitable for weight reduction of portable devices due to its heavy weight, is vulnerable to external shock so that it is difficult to implement an unbreakable property, and does not bend above a certain level so that the tempered glass is unsuitable as a flexible display material having a bendable or foldable function.

Recently, various studies on an optical plastic cover securing flexibility and impact resistance simultaneously with having strength or scratch resistance corresponding to tempered glass have been conducted. In general, examples of optical transparent plastic cover materials having flexibility as compared with tempered glass may include polyethylene terephthalate (PET), polyether sulfone (PES), polyethylene naphthalate (PEN), polyacrylate (PAR), polycarbonate (PC), polyimide (PI), polyarmide (PA), polyamideimide (PAI), and the like.

However, these polymer plastic substrates exhibit insufficient physical properties in terms of hardness and scratch resistance and also does not have sufficient impact resistance, as compared with tempered glass used as a window cover for display protection. Thus, various attempts for complementing the required physical properties by coating a composite resin composition on these plastic substrates, have been made. As an example, a plastic substrate disclosed in Korean Patent Laid-Open Publication No. 10-2013-0074167 is included.

In the case of a general hard coating, a composition including a resin containing a photocurable functional group such as (meth)acrylate or epoxy, a curing agent or a curing catalyst, and other additives is used, but it is difficult to implement high hardness corresponding to the tempered glass, a curling phenomenon occurs a lot due to shrinkage at the time of curing, and also flexibility is insufficient, and thus, the general hard coating has a disadvantage of being not appropriate as a protective window substrate for being applied to a flexible display.

RELATED ART DOCUMENTS

Korean Patent Laid-Open Publication No. 10-2013-0074167

SUMMARY

An embodiment of the present invention is directed to providing a composition for forming a hard coating layer which improves mechanical properties, hardness, an anti-curling property, and the like of a hard coating layer.

Another embodiment of the present invention is directed to providing a preparation method of a hard coating film having improved mechanical properties, hardness, anti-curling property, and the like.

Still another embodiment of the present invention is directed to providing a hard coating film having improved mechanical properties, hardness, anti-curling property, and the like.

In one general aspect, a composition for forming a hard coating layer includes: an epoxy siloxane resin, a crosslinking agent including a compound having an alicyclic epoxy group, a thermal initiator including a compound represented by the following Chemical Formula 2, and a photoinitiator:

[Chemical Formula 2]

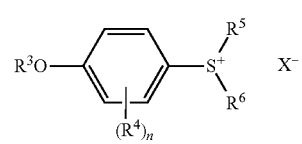

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

In some exemplary embodiments, the epoxy siloxane resin may have a weight average molecular weight of 1,000 to 20,000.

In some exemplary embodiments, the compound having an alicyclic epoxy group may be represented by the following Chemical Formula 1:

[Chemical Formula 1]

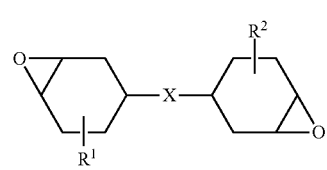

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

In another general aspect, a preparation method of a hard coating film according to the exemplary embodiments of the present invention includes: preparing a composition for forming a hard coating layer including an epoxy siloxane resin, a crosslinking agent including a compound having an alicyclic epoxy group, a thermal initiator including a compound represented by the following Chemical Formula 2, and a photoinitiator; applying the composition for forming a hard coating layer on a substrate; irradiating the applied composition for forming a hard coating layer with ultraviolet rays; and thermally curing the composition for forming a hard coating layer irradiated with ultraviolet rays to form a complexly cured hard coating layer.

[Chemical Formula 2]

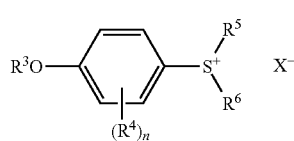

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

In some exemplary embodiments, the epoxy siloxane resin may have a weight average molecular weight of 1,000 to 20,000.

In some exemplary embodiments, the compound having an alicyclic epoxy group may be represented by the following Chemical Formula 1:

[Chemical Formula 1]

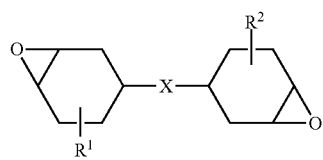

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

In some exemplary embodiments, the thermal curing may be carried out at a temperature of 100 to 200° C. for 5 to 20 minutes.

In some exemplary embodiments, pretreating the composition for forming a hard coating layer by heating before the ultraviolet irradiation may be further included.

In some exemplary embodiments, the pretreatment may be carried out at a lower temperature than the thermal curing.

In some exemplary embodiment, further applying the composition for forming a hard coating layer to a surface of the substrate on which the complexly cured hard coating layer is not formed; and ultraviolet-curing the further applied composition for forming a hard coating layer to form a photocured hard coating layer may be further included.

In some exemplary embodiment, a thickness ratio of the complexly cured hard coating layer to the photocured hard coating layer may be 1.1:1 to 8:1.

The hard coating film according to the exemplary embodiments of the present invention may be prepared by a preparation method of the hard coating film.

In still another general aspect, a hard coating film according to the exemplary embodiments of the present invention includes: a substrate; and a complexly cured hard coating layer formed on the substrate by complexly curing a composition including an epoxy siloxane resin and a crosslinking agent including a compound having an alicyclic epoxy group.

In exemplary embodiments, the complex curing may be curing including a thermal initiator and a photoinitiator.

In exemplary embodiments, the thermal initiator may include a compound represented by the following Chemical Formula 2:

[Chemical Formula 2]

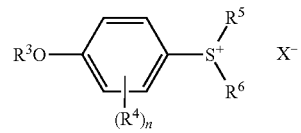

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

In exemplary embodiments, the compound having an alicyclic epoxy group may be represented by the following Chemical Formula 1:

[Chemical Formula 1]

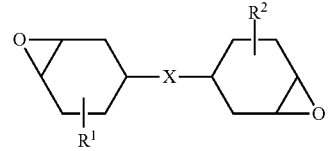

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

In exemplary embodiments, the hard coating film may further include a photocured hard coating layer formed by photocuring the composition on the surface of the substrate on which the complexly cured hard coating layer is not formed.

In exemplary embodiment, a thickness ratio of the complexly cured hard coating layer to the photocured hard coating layer may be 1.1:1 to 8:1.

In some exemplary embodiments, the hard coating film may have a curl amount of 5 mm or less, in which the curl amount is measured at each vertex of a square sample cut so that the length of each side is 10 cm and each side is inclined at an angle of 45° to an MD direction of the film.

Other features and aspects will be apparent from the following detailed description, the drawings, and the claims.

DETAILED DESCRIPTION OF EMBODIMENTS

Figure 1:
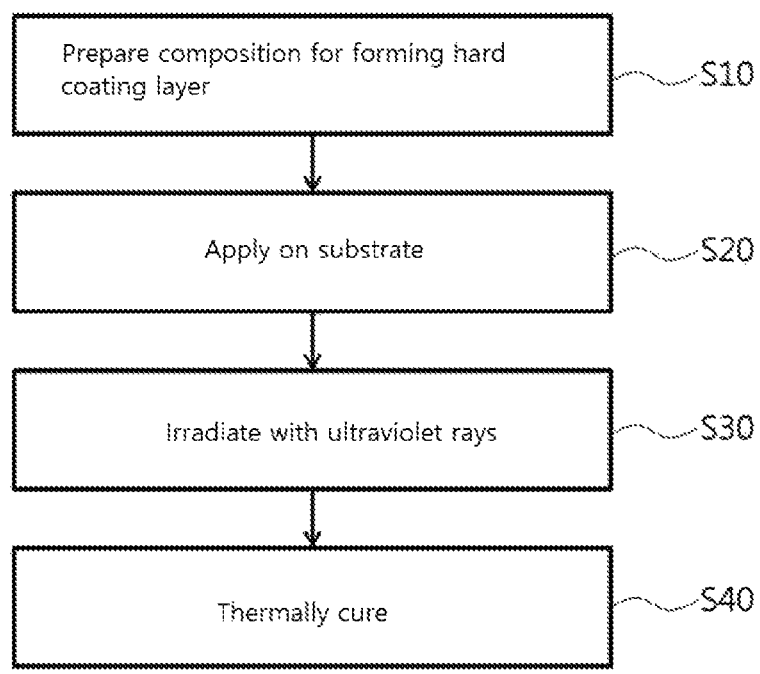
FIGS. 1 and 2 are schematic flow charts representing a preparation method of a hard coating film according to the exemplary embodiments of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The exemplary embodiments of the present invention include an epoxy siloxane resin, a crosslinking agent, a thermal initiator, and a photoinitiator to provide a composition for forming a hard coating layer which may decrease curls and increase hardness of a hard coating film. In addition, a preparation method of a hard coating film using the composition for forming a hard coating layer and a hard coating film prepared thereby are provided.

Hereinafter, the exemplary embodiments of the present invention will be described in detail. However, these are only illustrative and the present invention is not limited to the specific embodiments which are illustratively described by the present invention.

The terms "curl" and "curling" used in the present specification mean bending deformation of a film, and "curl amount" means a vertical height from the lowest point of the film to a point where the film is bent to be raised when a curled film is placed on a flat surface.

In exemplary embodiments, the composition for forming a hard coating layer of the present invention includes: an epoxy siloxane resin, a crosslinking agent including a compound having an alicyclic epoxy group, a thermal initiator including a compound represented by the following Chemical Formula 2, and a photoinitiator:

[Chemical Formula 2]

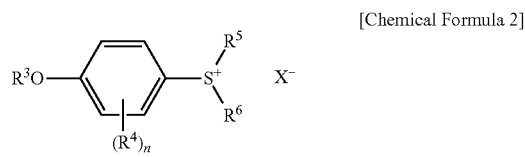

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

The alkoxy portion of the alkoxycarbonyl group has 1 to 4 carbon atoms, and examples of the alkoxycarbonyl group may include a methoxycarbonyl group, an ethoxycarbonyl group, a propoxycarbonyl group, and the like.

The alkyl portion of the alkylcarbonyl group has 1 to 4 carbon atoms, and examples of the alkylcarbonyl group may include an acetyl group, a propionyl group, and the like.

The aryl portion of the arylcarbonyl group has 6 to 14 carbon atoms, and examples of the arylcarbonyl group may include a benzoyl group, a 1-naphthylcarbonyl group, a 2-naphthylcarbonyl group, and the like.

Examples of the aralkyl group may include a benzyl group, a 2-phenylethyl group, a 1-naphthylmethyl group, a 2-naphthylmethyl group, and the like.

In the present invention, the epoxy siloxane resin may be a siloxane resin including an epoxy group. The epoxy group may be any one or more selected from the group consisting of a cyclic epoxy group, an aliphatic epoxy group, and an aromatic epoxy group. The siloxane resin may refer to a polymer compound in which a silicon atom and an oxygen atom form a covalent bond.

The epoxy siloxane resin may be for example, a silsesquioxane resin substituted by an epoxy group. For example, the epoxy siloxane resin may be that in which the silicon atom of the silsesquioxane resin is directly substituted by an epoxy group or the substituent on the silicon atom is substituted by an epoxy group. As a non-limiting example, the epoxy siloxane resin may be a silsesquioxane resin substituted by a 2-(3,4-epoxycyclohexyl) ethyl group.

According to some exemplary embodiments, the epoxy siloxane resin may have a weight average molecular weight of 1,000 to 20,000, more preferably 1,000 to 18,000, and more preferably 2,000 to 15,000. When the weight average molecular weight is within the above range, the composition for forming a hard coating layer may have more proper density. Thus, the flowability, coatability, curing reactivity, and the like of the composition for forming a hard coating layer may be further improved. In addition, the hardness of the hard coating layer may be further improved and the flexibility of the hard coating layer is improved, thereby further suppressing occurrence of curling.

The epoxy siloxane resin according to the present invention may be prepared by hydrolysis and a condensation reaction of alkoxysilane having an epoxy group alone or between alkoxysilane having an epoxy group and another kind of alkoxysilane, in the presence of water.

According to exemplary embodiments, the alkoxysilane having an epoxy group may be exemplified by the following Chemical Formula 12:

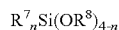   [Chemical Formula 12]

wherein $R^7$ is an epoxycycloalkyl group having 3 to 6 carbon atoms or a linear or branched alkyl group having 1 to 6 carbon atoms substituted by an oxiranyl group, in which the alkyl group may include an ether group, $R^8$ is a linear or branched alkyl group having 1 to 7 carbon atoms, and n is an integer of 1 to 3.

The alkoxysilane represented by the above Chemical Formula 12 is not particularly limited, and examples thereof may include 2-(3,4-epoxycyclohexyl)ethyltrimethoxysilane, 2-(3,4-epoxycyclohexyl)ethyltriethoxysilane, 3-glycidoxypropyltrimethoxysilane, and the like. These may be used alone or in combination of two or more.

In some exemplary embodiments, the epoxy siloxane resin may be included at 10 to 80 parts by weight, based on 100 parts by weight of the entire composition. More preferably, the epoxy siloxane resin may be included at 20 to 70 parts by weight, and still more preferably 20 to 50 parts by weight, based on 100 parts by weight of the entire composition. When the above range is satisfied, the composition for forming a hard coating layer may secure better flowability and coating property. In addition, uniform curing is possible at the time of curing the composition for forming a hard coating layer to more effectively prevent physical defects such as cracks due to overcuring. In addition, the hard coating layer may exhibit better hardness.

In the present invention, the crosslinking agent may form crosslinks with the epoxy siloxane resin to solidify the composition for forming a hard coating layer and improve the hardness of the hard coating layer.

In the present invention, the crosslinking agent may include a compound having an alicyclic epoxy group.

According to exemplary embodiments, the compound having an alicyclic epoxy group may be a compound in which two 3,4-epoxycyclohexyl groups are connected to each other. More specifically, the compound having an alicyclic epoxy group may be represented by the following Chemical Formula 1. The compound having an alicyclic epoxy group may have similar structure and characteristics to the epoxy siloxane resin. In this case, the crosslinking of the epoxy siloxane resin is promoted and the composition may be maintained at a proper density.

[Chemical Formula 1]

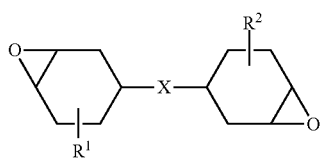

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

In the present specification, a "direct bond" refers to a structure which is directly bonded without any functional group, and for example, in Chemical Formula 1, refers to two cyclohexanes directly connected to each other. In addition, in the present invention, a "connecting group" refers to two or more substituents described above being connected to each other.

In addition, in Chemical Formula 1, the substitution positions of $R^1$ and $R^2$ are not particularly limited, but when the carbon connected to X is set at position 1, and the carbons connected to an epoxy group are set at positions 3 and 4, it is preferred that $R^1$ and $R^2$ are substituted at position 6.

The compound described above includes a cyclic epoxy structure in the molecule, and when the epoxy structure is formed in a linear shape as in Chemical Formula 1, the viscosity of the composition may be lowered to an appropriate range. When the viscosity is lowered, the coatability of the composition is improved and also the reactivity of the epoxy group is further improved, thereby promoting the curing reaction. In addition, crosslinks with the epoxy siloxane resin is formed to improve the hardness of the hard coating layer.

Specific examples of the compound represented by Chemical Formula 1 may include compounds represented by the following Chemical Formulae 3 to 11, but are not limited thereto. The compounds represented by the following Chemical Formulae 3 to 11 may be used alone or in combination of two or more.

[Chemical Formula 3]

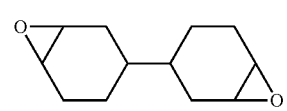

[Chemical Formula 4]

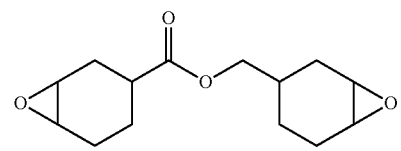

[Chemical Formula 5]

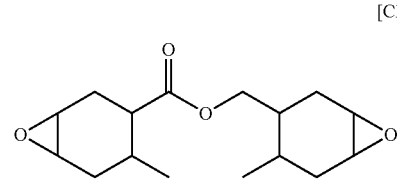

[Chemical Formula 6]

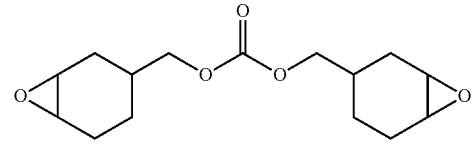

[Chemical Formula 7]

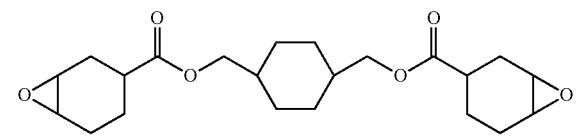

-continued

[Chemical Formula 8]
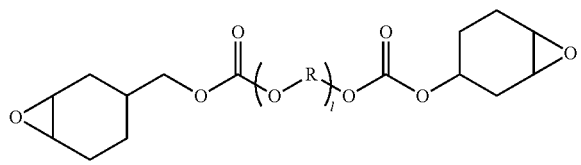

[Chemical Formula 9]
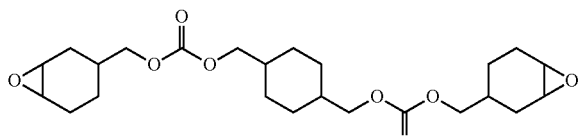

[Chemical Formula 10]
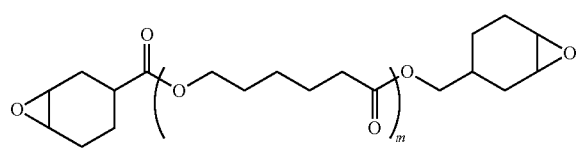

[Chemical Formula 11]
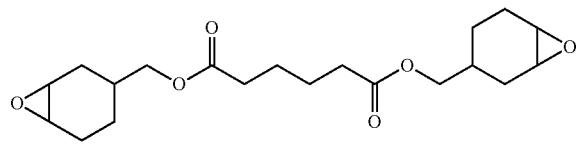

In Chemical formula 8, R is a linear or branched alkylene group having 1 to 8 carbon atoms, and 1 is an integer of 1 to 30, and in Chemical Formula 10, m is an integer of 1 to 30.

The content of the crosslinking agent according to the present invention is not particularly limited, and for example, may be 5 to 150 parts by weight, based on 100 parts by weight of the epoxy siloxane resin. When the content of the crosslinking agent is within the above range, the viscosity of the composition for forming a hard coating layer may be maintained in an appropriate range, and coatability and curing reactivity may be improved.

In addition, the crosslinking agent may be included at 1 to 30 parts by weight, based on 100 parts by weight of the entire composition. More preferably, the crosslinking agent may be included at 5 to 20 parts by weight, based on 100 parts by weight of the entire composition.

In the present invention, the thermal initiator may promote the crosslinking reaction of the epoxy siloxane resin or the agent when heat is applied to the composition for forming a hard coating layer. As the thermal initiator, a cationic thermal initiator may be used, but not limited thereto.

In addition, photocuring using the photoinitiator described later is used in combination with the thermal curing using the thermal initiator, thereby improving a curing degree, hardness, flexibility, and the like of the hard coating layer and decreasing curling.

For example, the composition for forming a hard coating layer is applied to a substrate or the like and is irradiated with ultraviolet rays (photocuring) to at least partially cure the composition, and then heat is further applied (thermal curing) to substantially completely cure the composition.

That is, the composition for forming a hard coating layer may be semi-cured or partially cured by the photocuring, and the semi-cured or partially cured composition for forming a hard coating layer may be substantially completely cured by the thermal curing.

When the composition for forming a hard coating layer is cured only by photocuring, a curing time is excessively extended or in part, curing may not be completely performed. However, when the photocuring is followed by the thermal curing, the portion which is not cured by the photocuring may be substantially completely cured by the thermal curing, and the curing time may be also reduced.

In general, a portion which is appropriately cured is provided with excessive energy due to an increase in the curing time (for example, an increase in light exposure time), so that overcuring may occur. When the overcuring proceeds, the hard coating layer lose flexibility or mechanical defects such as curls or cracks may occur. Accordingly, in the present invention, the photocuring and the thermal curing are used in combination, thereby substantially completely curing the composition for forming a hard coating layer for a short time. Thus, the hardness may be maintained and occurrence of curling may be suppressed, while the flexibility is maintained, in the hard coating layer.

Though the method of first photocuring the composition for forming a hard coating layer and further thermally curing the composition has been described above, the sequence of the photocuring and the thermal curing is not particularly limited thereto. That is, in some exemplary embodiments, the thermal curing may first proceed and then the photocuring may proceed, of course.

In exemplary embodiments, the thermal initiator may include a compound represented by the following Chemical Formula 2. The compound of the following Chemical Formula 2 may act, for example, as a cationic thermal initiator. When the compound of the following Chemical Formula 2 is used as the thermal initiator, the curing half-life may be shortened. Accordingly, the thermal curing may be performed rapidly even under the low-temperature conditions, thereby preventing damage and deformation which occur in the case of long-term heat treatment under the high-temperature conditions.

[Chemical Formula 2]
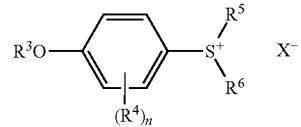

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

In some exemplary embodiments, the thermal initiator may be included at 0.1 to 60 parts by weight, more preferably 0.5 to 45 parts by weight, and still more preferably 1 to 30 parts by weight, based on 100 parts by weight of the epoxy siloxane resin. When the content of the thermal initiator is within the above range, the thermal curing may proceed at an effective speed, and the contents of other components of the composition are decreased to prevent the mechanical properties (for example, hardness, flexibility, an anti-curling property, and the like) of the hard coating layer from being deteriorated.

In addition, for example, the thermal initiator may be included at 0.1 to 20 parts by weight, more preferably 0.2 to 15 parts by weight, and still more preferably 0.5 to 10 parts by weight, based on 100 parts by weight of the entire composition. In this case, excellent hardness and anti-curling property may be exhibited. In particular, when the thermal initiator is included at 0.5 to 10 parts by weight, based on 100 parts by weight of the entire composition, significantly excellent hardness and anti-curling property may be exhibited.

According to the exemplary embodiments, the composition for forming a hard coating layer may further include a thermal curing agent.

The thermal curing agent may include an amine-based curing agent, an imidazole-based curing agent, an acid anhydride-based curing agent, an amide-based thermal curing agents, and the like, and in terms of discoloration prevention and high hardness implementation, it is more preferred to further use an acid anhydride-based thermal curing agent. These may be used alone or in combination of two or more.

The content of the thermal curing agent is not particularly limited, and for example, may be 5 to 30 parts by weight, based on 100 parts by weight of the epoxy siloxane resin. When the content of the thermal curing agent is within the above range, the hardness efficiency of the composition may be further improved to form a hard coating layer having excellent hardness.

In the present invention, the photoinitiator may include a photo-cationic initiator. The photo-cationic initiator may initiate polymerization of the epoxy siloxane resin and an epoxy-based monomer.

As the photo-cationic initiator, for example, an onium salt and/or organic metal salt may be used, but not limited thereto. For example, a diaryliodonium salt, a triarylsulfonium salt, an aryldiazonium salt, an iron-arene complex, and the like may be used. These may be used alone or in combination of two or more.

The content of the photoinitiator is not particularly limited, but for example, the photoinitiator may be included at 0.1 to 15 parts by weight, and more preferably 1 to 15 parts by weight, based on 100 parts by weight of the epoxy siloxane resin. When the content of the photoinitiator is within the above range, excellent curing efficiency of the composition may be maintained, and deterioration of the physical properties due to residual components after curing may be prevented.

In addition, for example, the photoinitiator may be included at 0.01 to 10 parts by weight, more preferably 0.1 to 10 parts by weight, and still more preferably 0.5 to 5 parts by weight, based on 100 parts by weight of the entire composition.

In some exemplary embodiments, the composition for forming a hard coating layer may further include a solvent. The solvent is not particularly limited and a solvent known in the art may be used.

Non-limiting examples of the solvent may include alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

The content of the solvent is not particularly limited, and for example, may be 10 to 500 parts by weight, based on 100 parts by weight of the epoxy siloxane resin. When the above range is satisfied, the composition for forming a hard coating layer may secure an appropriate level of viscosity, and workability at the time of forming the hard coating layer may be better. In addition, it is easy to control the thickness of the hard coating layer, and the solvent drying time is reduced to secure a rapid process speed.

In addition, for example, the solvent may be included at a residual amount excluding the amount of the remaining components in the total weight of the predetermined entire composition. For example, when the total weight of the predetermined entire composition is 100 g and the sum of the weights of the remaining components excluding the solvent is 70 g, 30 g of the solvent will be included.

In some exemplary embodiments, the composition for forming a hard coating layer may further include an inorganic filler. The inorganic filler may improve the hardness of the hard coating layer.

The inorganic filler is not particularly limited, and examples thereof may include metal oxides such as silica, alumina, and titanium oxide; hydroxides such as aluminum hydroxide, magnesium hydroxide, and potassium hydroxide; metal particles such as gold, silver, copper, nickel, and an alloy thereof; conductive particles such as carbon, carbon nanotubes, and fullerene; glass; ceramic; and the like. Preferably, silica may be used in terms of compatibility with other components of the composition. These may be used alone or in combination of two or more.

In some exemplary embodiments, the composition for forming a hard coating layer may further include a lubricant. The lubricant may improve winding efficiency, blocking resistance, wear resistance, scratch resistance, and the like.

The kind of the lubricants is not particularly limited, and for example, waxes such as polyethylene wax, paraffin wax, synthetic wax, or montan wax; synthetic resins such as a silicone-based resin or a fluorine-based resin; and the like may be used. These may be used alone or in combination of two or more.

In addition, the composition for forming a hard coating layer may further include additives such as, for example, an antioxidant, a UV absorber, a photostabilizer, a thermal polymerization inhibitor, a leveling agent, a surfactant, a lubricant, and an antifouling agent.

In addition, the present invention provides a hard coating film including: a substrate; and a complexly cured hard coating layer formed by complexly curing a composition including an epoxy siloxane resin and a crosslinking agent including a compound having an alicyclic epoxy group, on the substrate.

Herein, the complex curing may refer to curing using curing methods having different curing mechanisms, for example, photocuring and thermal curing in combination. That is, the complex curing may be curing including a photoinitiator and a thermal initiator. This is as described above and will be described later, and the specific description therefor will be omitted herein.

In exemplary embodiments, the hard coating film may further include photocured hard coating layer formed by photocuring the composition on the surface of the substrate on which the complexly cured hard coating layer is not formed.

In exemplary embodiments, a thickness ratio of the complexly cured hard coating layer to the photocured hard coating layer may be 1:1 to 10:1, more preferably 1.1:1 to 8:1, and still more preferably 2:1 to 6:1.

In the hard coating film of the present invention, the epoxy siloxane resin, the crosslinking agent including the compound having an alicyclic epoxy group, the photoinitiator, and the thermal initiator may be as described above, and thus, the specific description thereof will be omitted herein. In addition, the specific description of the substrate will be described later.

The present invention provides an exemplary method of preparing the hard coating film.

In exemplary embodiments, the hard coating film may be prepared using the composition for forming a hard coating layer. Hereinafter, referring to the drawings, the preparation method of a hard coating film and the hard coating film prepared thereby will be described.

FIG. 1 is schematic flow charts representing a preparation method of a hard coating film according to the exemplary embodiments of the present invention.

Figure 3:
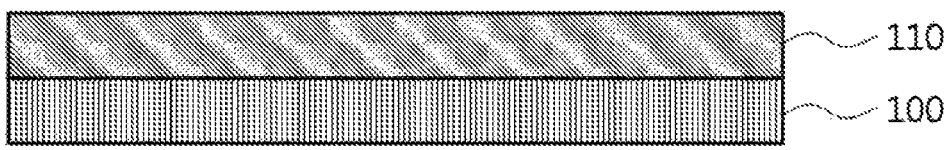
FIGS. 3 and 4 are schematic drawings illustrating a hard coating film according to the exemplary embodiments of the present invention.

FIG. 3 is schematic drawings illustrating a hard coating film according to the exemplary embodiments of the present invention.

Referring to FIG. 1, a composition for forming a hard coating layer is prepared (for example, S10), the composition is applied on a substrate (for example, S20), ultraviolet rays are irradiated thereon (for example, S30), thermal curing is performed (for example, S40), thereby capable of preparing a hard coating film.

Referring to FIG. 3, the hard coating film 10 may include a substrate 100 and a complexly cured hard coating layer 110.

The composition for forming a hard coating layer of the present invention includes: an epoxy siloxane resin, a crosslinking agent including a compound having an alicyclic epoxy group, a thermal initiator including a compound represented by Chemical Formula 2, and a photoinitiator.

The thermal initiator including the compound represented by Chemical Formula 2 may have a short curing half-life. For example, rapid thermal curing may be performed even under a low temperature condition. Accordingly, damage and deformation which occur in the case of long-term heat treatment under the high-temperature conditions may be prevented.

According to some exemplary embodiments, the epoxy siloxane resin may have a weight average molecular weight of 1,000 to 20,000.

In some exemplary embodiments, the compound having an alicyclic epoxy group may be represented by Chemical Formula 1.

The composition for forming a hard coating layer may be applied on a substrate 100 (for example, S20).

It is preferred that the substrate 100 has excellent transparency, mechanical strength, thermal stability, moisture shielding property, isotropy, and the like. The substrate 100 may be manufactured from, for example, polyester-based resins such as polyethylene terephthalate, polyethylene isophthalate, and polybutylene terephthalate; cellulose-based resins such as diacetyl cellulose and triacetyl cellulose; polycarbonate-based resins; acrylic resins such as polymethyl (meth)acrylate and polyethyl (meth)acrylate; styrene-based resins such as a polystyrene acrylonitrile-styrene copolymer; polyolefin-based resin having a polyethylene, polypropylene, cyclo-based or norbornene structure, polyolefin-based resins such as an ethylene propylene copolymer; polyimide-based resins; polyaramide-based resins; polyamideimide-based resins; polyethersulfone-based resins; sulfone-based resins, and the like. These resins may be used alone or in combination of two or more.

The thickness of the substrate 100 is not particularly limited, and for example, may be 10 to 250 µm.

The application (for example, S20) may be carried out by a die coater, an air knife, a reverse roll, spray, a blade, casting, gravure, spin coating, and the like.

According to some exemplary embodiments, the applied composition for forming a hard coating layer may be irradiated with ultraviolet rays (for example, S30). The composition for forming a hard coating layer may be at least partially photocured by the ultraviolet irradiation.

In exemplary embodiments, the ultraviolet irradiation may be carried out so that a curing degree of the composition for forming a hard coating layer is about 20 to 80%. When the curing degree is within the range, the hard coating layer is primarily cured to secure hardness, and simultaneously prevents an overcuring phenomenon due to an extended light exposure time.

For example, the ultraviolet irradiation may be carried out so that a pencil hardness of the cured hard coating layer is 1H or less. That is to say, the ultraviolet irradiation is finished before the pencil hardness of the hard coating layer becomes about 1H, and the thermal curing may be carried out.

In exemplary embodiments, the composition for forming a hard coating layer irradiated with ultraviolet rays may be thermally cured to form a complexly cured hard coating layer 110 (for example, S40).

For example, heat is applied to the hard coating layer composition which has been primarily partially cured by ultraviolet irradiation to substantially completely cure the composition. Accordingly, the photocuring and the thermal curing having different curing mechanisms are used in combination, thereby reducing a curing time to suppress the overcuring phenomenon as compared with the case of performing curing by photocuring or thermal curing alone, and a crosslinking reaction is effectively derived so that the crosslinks are evenly formed.

Thus, the hardness of the complexly cured hard coating layer 110 is improved, while flexibility is maintained. In addition, curling of the hard coating film 10 may be significantly decreased.

In some exemplary embodiments, the thermal curing may be carried out at a temperature of 100 to 200° C. for 5 to 20 minutes. More preferably, the thermal curing may be carried out at a temperature of 120 to 180° C. Within the temperature range, the thermal curing may proceed at an effective speed, and crack occurrence due to thermal decomposition or a side reaction of each component in the composition or overcuring of the hard coating layer may be effectively prevented.

According to exemplary embodiments, pretreatment may be carried out by heating the composition for forming a hard coating layer before ultraviolet irradiation. During the pretreatment process, a highly volatile solvent may be evaporated before ultraviolet irradiation, and thus, occurrence of bubbles and uneven curing during ultraviolet irradiation may be prevented.

The pretreatment may be carried out at lower temperature than the thermal curing temperature, and for example, carried out at 40 to 80° C. Within the temperature range, the solvent may be effectively evaporated while the initiation reaction of the thermal initiator does not occur.

The thickness of the complexly cured hard coating layer 110 is not particularly limited, and for example, may be 5 to 100 µm. More preferably, the thickness may be 5 to 50 µm.

When the thickness is within the range, the hard coating layer may have excellent hardness, maintain flexibility, and does not substantially produce curling.

According to exemplary embodiments, the hard coating film 10 may have a curl amount of 5 mm or less, in which the curl amount is measured at each vertex of a square sample cut so that the length of each side is 10 cm and each side is inclined at an angle of 45° to an MD direction of the film.

The curl may refer to a vertical height from the lowest position (for example, a center) to the vertex of the film, for each vertex of the sample cut into a square which is inclined at an angle of 45° to the MD direction and has each side of 10 cm in length. In the present specification, the MD direction is a machine direction, and refers to a direction in which the film moves along an automated machine when the film is drawn or laminated by an automation process. As the curl is measured for the sample inclined at the angle of 45° to the MD direction, the curls at each vertex means curls to the MD direction and a direction perpendicular to the MD direction, thereby distinguishing the curls.

According to some exemplary embodiments, the complexly cured hard coating layer 110 may be formed on both surfaces of the substrate 100, or the complexly cured hard coating layer 110 may be formed only one surface of the substrate 100.

Figure 2:
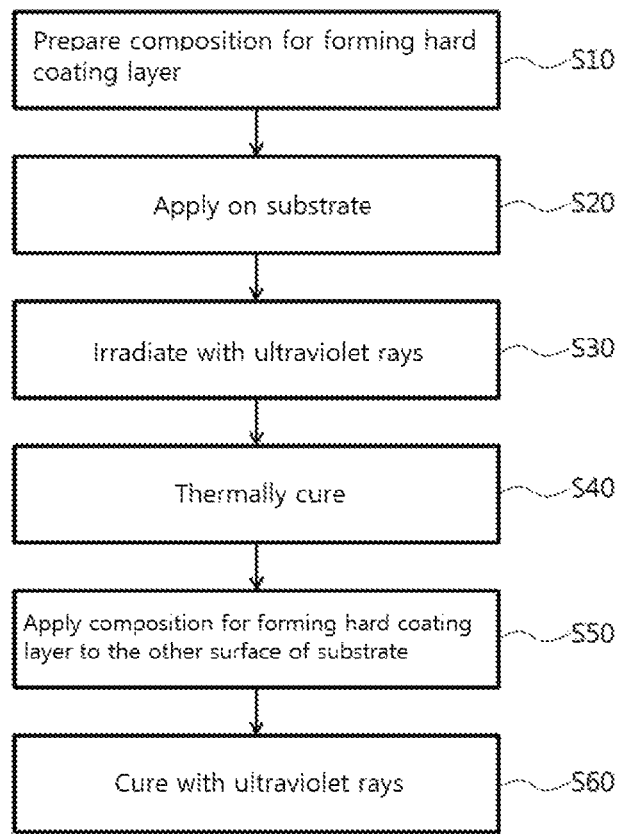

FIG. 2 is schematic flow charts representing a preparation method of a hard coating film according to the exemplary embodiments of the present invention.

Figure 4:
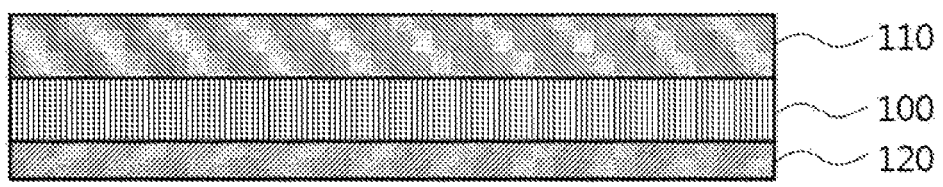

FIG. 4 is schematic flow charts illustrating a hard coating film according to the exemplary embodiments of the present invention.

According to FIG. 2, after forming the complexly cured hard coating layer (for example, S40), a composition for forming a hard coating layer is further applied to the surface opposite to the surface of the substrate on which the complexly cured hard coating layer is formed (for example, S50), and ultraviolet irradiation (for example, S60) may be carried out.

Referring to FIG. 4, the thus-prepared hard coating film may include a substrate 100, a complexly cured hard coating layer 110, and a photocured hard coating layer 120.

The further application may be carried out in the same manner as the application of the composition for forming a hard coating layer (for example, S20).

The ultraviolet irradiation curing (for example, S60) may be carried out so that a curing degree is shown to be higher than at the time of the ultraviolet irradiation (for example, S30). Accordingly, an appropriate curing degree may be secured even in the case that only photocuring is carried out for the photocured hard coating layer 120.

For example, formation of the photocured hard coating layer 120 may be carried out by omitting a thermal curing step in a formation process of the complexly cured hard coating layer 110.

Accordingly, the complexly cured hard coating layer 110 is formed on one surface of the substrate 100 and the photocured hard coating layer 120 may be formed on the other surface. By forming hard coating layers having different mechanical properties on both surfaces of the substrate 100, bending in an upper surface direction, and bending in a lower surface direction of the hard coating film are partially offset, so that the curl of the hard coating film may be further suppressed. In addition, even in the case that the hard coating film is deformed to be bent in various directions, shape resilience may be secured, and even in the case that repeated deformation is performed, formation of physical defects such as cracks may be suppressed.

According to exemplary embodiment, though not limited thereto, a thickness ratio of the complexly cured hard coating layer 110 to the photocured hard coating layer 120 may be 1:1 to 10:1.

According to exemplary embodiments, the complexly cured hard coating layer 110 may be thicker than the photocured hard coating layer 120. For example, a ratio of the thicknesses of the complexly cured hard coating layer 110 to the photocured hard coating layer 120 may be 1.1:1 to 8:1. More preferably, the ratio may be 2:1 to 6:1. Within the range of the thickness ratio, a difference in the thickness is controlled to an appropriate range, thereby further improving a curl suppression characteristic, shape resilience, and the like of the hard coating film may be further improved.

For example, the thickness of the complexly cured hard coating layer 110 may be 5 to 100 µm. More preferably, the thickness may be 10 to 50 µm. When the thickness is within the range, the hard coating layer may have excellent hardness, maintain flexibility, and does not substantially produce curling.

In addition, for example, the thickness of the photocured hard coating layer 120 may be 1 to 20 µm. More preferably, the thickness may be 2 to 10 µm. Within the range of the thickness, an appropriate thickness ratio between the complexly cured hard coating layer 110 and the photocured hard coating layer 120 is satisfied, thereby securing bending offset and a shape resilience improvement effect by both hard coating layers. In some exemplary embodiments, the hard coating film 10 has a high surface hardness, excellent flexibility, and excellent impact resistance as compared with tempered glass, and thus, may be preferably used as a window substrate of the outermost surface of the display panel.

According to some exemplary embodiments, an image display including the hard coating film 10 may be provided.

The hard coating film 10 may be used as the outermost surface window substrate of the thermal image display. The image display may be various image displays such as a common liquid crystal display, an electroluminescence display, a plasma display, and a field emission display.

Hereinafter, preferred examples will be provided in order to assist in the understanding of the present invention. However, it will be obvious to those skilled in the art that these examples only illustrate the present invention and do not limit the appended claims, and various modifications and alterations of the examples may be made within the range of the scope and spirit of the present invention, and these modifications and alterations will fall within the appended claims.

PREPARATION EXAMPLE 2-(3,4-Epoxycyclohexyl)ethyltrimethoxysilane (ECTMS, TCI Co., Ltd.) and water ($H_2O$, Sigma-Aldrich Corporation) were mixed at a ratio of 24.64 g:2.70 g (0.1 mol: 0.15 mol) and placed in a 250 mL 2-neck flask. Thereafter, 0.1 mL of a tetramethylammonium hydroxide catalyst (Sigma-Aldrich) and 100 mL of tetrahydrofuran (Sigma-Aldrich) were added to the mixture and stirred at 25° C. for 36 hours. Then, layer separation was performed and a product layer was extracted with methylene chloride (Sigma-Aldrich), and moisture was removed from the extract with magnesium sulfate (Sigma-Aldrich) and the solvent was dried under vacuum to obtain an epoxy siloxane resin. As a result of measuring the epoxy siloxane resin using gel permeation chromatography (GPC), the weight average molecular weight was 2500.

EXAMPLES 1 TO 14, AND COMPARATIVE EXAMPLES 1 AND 2

The epoxy siloxane resin prepared in the Preparation Example, a crosslinking agent, a thermal initiator, a photoinitiator, and a solvent were mixed at a weight ratio shown in the following table 1, relative to the total weight of the composition, thereby preparing a composition for forming a hard coating layer.

The composition for forming a hard coating layer was applied on a colorless polyimide (cPI) film having a thickness of 80 μm by a Meyer bar method, and was allowed to stand at a temperature of 60° C. for 5 minutes.

UV was irradiated at 1 J/cm² using a high-pressure metal lamp and then curing was performed at a temperature of 120° C. for 15 minutes to prepare a hard coating film on which a complexly cured hard coating layer having a thickness of 30 μm is formed.

EXAMPLE 15 AND COMPARATIVE EXAMPLE 3

A composition for forming a hard coating layer was prepared by mixing each component as shown in the following Table 1.

The composition for forming a hard coating layer was applied on an upper surface of a cPI film having a thickness of 80 μm by a Meyer bar method, and was allowed to stand at a temperature of 60° C. for 5 minutes.

UV was irradiated at 1 J/cm² using a high-pressure metal lamp and then curing was performed at a temperature of 120° C. for 15 minutes to prepare a complexly cured hard coating layer having a thickness of 20 μm is formed.

The composition for forming a hard coating layer was applied on a lower surface of the cPI film on which the complexly cured hard coating layer was not formed by a Meyer bar method, and was allowed to stand at a temperature of 60° C. for 5 minutes. Thereafter, UV was irradiated at 1 J/cm² using a high-pressure metal lamp to form a photocured hard coating layer having a thickness of 5 μm, thereby preparing the hard coating films of Examples 15 and Comparative Examples 3.

TABLE 1

| Classification | Epoxy siloxane resin | Crosslinking agent Type | content | Thermal initiator Type | content | Photo-initiator Type | content | Solvent | Others Type | content |
|---|---|---|---|---|---|---|---|---|---|---|
| Example 1 | 35 | A-1 | 10 | B-1 | 1 | C-1 | 1 | 53 | | |
| Example 2 | 35 | A-1 | 10 | B-1 | 5 | C-1 | 1 | 49 | | |
| Example 3 | 35 | A-1 | 10 | B-1 | 0.1 | C-1 | 1 | 53.9 | | |
| Example 4 | 35 | A-1 | 10 | B-1 | 0.2 | C-1 | 1 | 53.8 | | |
| Example 5 | 35 | A-1 | 10 | B-1 | 0.5 | C-1 | 1 | 53.5 | | |
| Example 6 | 35 | A-1 | 10 | B-1 | 10 | C-1 | 1 | 44 | | |
| Example 7 | 35 | A-1 | 10 | B-1 | 15 | C-1 | 1 | 39 | | |
| Example 8 | 35 | A-1 | 10 | B-1 | 20 | C-1 | 1 | 34 | | |
| Example 9 | 30 | A-1 | 15 | B-1 | 0.5 | C-1 | 1 | 53.5 | | |
| Example 10 | 15 | A-1 | 10 | B-1 | 1 | C-1 | 1 | 73 | | |
| Example 11 | 20 | A-1 | 10 | B-1 | 1 | C-1 | 1 | 68 | | |
| Example 12 | 50 | A-1 | 10 | B-1 | 1 | C-1 | 1 | 38 | | |
| Example 13 | 70 | A-1 | 10 | B-1 | 1 | C-1 | 1 | 18 | | |
| Example 14 | 80 | A-1 | 10 | B-1 | 1 | C-1 | 1 | 8 | | |
| Example 15 | 30 | A-1 | 15 | B-2 | 1 | C-1 | 1 | 52 | D | 1 |
| Comparative Example 1 | 35 | A-2 | 10 | B-1 | 1 | C-1 | 1 | 53 | | |
| Comparative Example 2 | 35 | A-1 | 10 | — | — | C-1 | 1 | 54 | | |
| Comparative Example 3 | — | — | — | — | — | C-2 | 1 | 59 | E | 40 |

Epoxy siloxane resin: Preparation Example
A-1: (Daicel Corporation, Celloxide 2021P)
A-2:

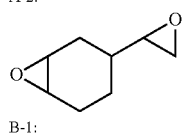

B-1:

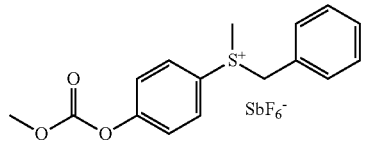

B-2: 4-Acetoxyphenyldiphenylsulfonium hexafluoroantimonate (SANSHIN CHEMICAL INDUSTRY CO., LTD.)
C-1: (4-Methylphenyl)[4-(2-methylpropyl)phenyl]iodonium hexafluorophosphate
C-2: 1-hydroxycyclohexylphenylketone
Solvent: methyl ethyl ketone (Sigma-Aldrich)
D: Fluorine polymer (Central Glass Co., Ltd, cc-04)
E (photopolymerizable compound): pentaerythritol tetraactylate

EXAMPLES 16 TO 21

A hard coating film was prepared in the same manner as in Example 15, except that the thicknesses of the complexly cured hard coating layer and the photocured hard coating layer were changed as shown in the following Table 2.

TABLE 2

| Classification | Thickness of complexly cured hard coating layer (μm) | Thickness of photocured hard coating layer (μm) |
| --- | --- | --- |
| Example 15 | 20 | 5 |
| Example 16 | 5 | 5 |
| Example 17 | 5.5 | 5 |
| Example 18 | 10 | 5 |
| Example 19 | 30 | 5 |
| Example 20 | 40 | 5 |
| Example 21 | 50 | 5 |

EXPERIMENTAL EXAMPLE

The pencil hardness and the anti-curling property of the hard coating films of the Examples and the Comparative Examples were evaluated.

1. Measurement of Pencil Hardness

A pencil hardness on the surface of the complexly cured hard coating layer of a hard coating film was measured using pencils by hardness (Mitsubishi Pencil Co., Ltd.) under a load of 1 kg using a pencil hardness tester (Kipae E&T Co. Ltd.) in accordance with ASTM D3363. The measured pencil hardness is shown in the following Table 3.

2. Measurement of Curl Amount

A hard coating film was cut into a square of 10 cm×10 cm inclined at 45° to an MD direction and then allowed to stand at 25° C., 50% under constant temperature and humidity conditions, and then the curling degree of each vertex was measured using a ruler. The measured curl amount is shown in the following Table 3.

TABLE 3

| Classification | Pencil hardness | Curl amount |
| --- | --- | --- |
| Example 1 | 8H | 0.2 mm |
| Example 2 | 8H | 0.5 mm |
| Example 3 | 5H | 3 mm |
| Example 4 | 7H | 2 mm |
| Example 5 | 8H | 0.1 mm |
| Example 6 | 8H | 0.5 mm |
| Example 7 | 7H | 2 mm |
| Example 8 | 5H | 3 mm |
| Example 9 | 8H | 1 mm |
| Example 10 | 5H | 3 mm |
| Example 11 | 8H | 0.5 mm |
| Example 12 | 8H | 1 mm |
| Example 13 | 6H | 2 mm |
| Example 14 | 5H | 3 mm |
| Example 15 | 8H | 0.5 mm |
| Example 16 | 6H | 1 mm |
| Example 17 | 7H | 0.5 mm |
| Example 18 | 8H | 0.5 mm |
| Example 19 | 8H | 0.5 mm |
| Example 20 | 8H | 1 mm |
| Example 21 | 8H | 3 mm |
| Comparative Example 1 | 4H | 6 mm |
| Comparative Example 2 | 4H | 10 mm |
| Comparative Example 3 | 5H | 50 mm or more |

Referring to Table 3, it was found that the compositions for forming a hard coating layer according to the Examples of the present invention formed hard coating films having significantly improved hardness and anti-curling property as compared with the hard coating films of the Comparative Examples.

In addition, when the complexly cured hard coating layer was formed on one surface of the substrate according to the Examples of the present invention, and then the photocured hard coating layer was formed on the other surface of the substrate, it was found that hardness and an anti-curling property were further improved.

The composition for forming a hard coating layer according to the exemplary embodiments of the present invention includes the thermal initiator represented by Chemical Formula 2 to reduce a curing half-life of the composition, thereby allowing the composition to be rapidly thermally cured at a low temperature. Thus, physical defects such as cracks or curls which occur by excessively exposing the composition for forming a hard coating layer to light during a curing process may be prevented. In addition, the composition may be uniformly cured within a short time to prevent occurrence of curling and increase the hardness of the hard coating layer.

In addition, by including the thermal initiator, a curing process of the composition for forming a hard coating layer may be performed sequentially in two steps of photocuring and thermal curing, and thus, hardness and an anti-curling property of the hard coating layer may be improved.

In some exemplary embodiment, a complexly cured hard coating layer obtained by photocuring and then thermally curing the composition for forming a hard coating layer is disposed on one surface of the substrate and a photocured hard coating layer obtained by photocuring the composition for forming a hard coating layer is disposed on the other surface of the substrate, thereby further improving the anti-curling property and shape resilience of the hard coating film.

DETAILED DESCRIPTION OF MAIN ELEMENTS

10: Hard coating film
100: Substrate
110: Complexly cured hard coating layer
120: Photocured hard coating layer

What is claimed is:

1. A composition for forming a hard coating layer, the composition consisting of: an epoxy siloxane resin, a crosslinking agent including a compound having an alicyclic epoxy group, a thermal initiator including a compound represented by the following Chemical Formula 2, a photoinitiator, and optionally at least one additive selected from the group consisting of a thermal curing agent, a solvent, an inorganic filler, a lubricant, an antioxidant, a UV absorber, a photostabilizer, a thermal polymerization inhibitor, a leveling agent, a surfactant and an antifouling agent, wherein the lubricant is at least one selected from the group consisting of wax, fluorine-based resin, and mixtures thereof:

[Chemical Formula 2]

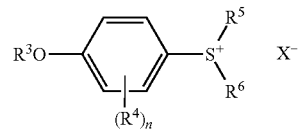

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to 15 carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

2. The composition for forming a hard coating layer of claim 1, wherein the epoxy siloxane resin has a weight average molecular weight of 1,000 to 20,000.

3. The composition for forming a hard coating layer of claim 1, wherein the compound having an alicyclic epoxy group is represented by the following Chemical Formula 1:

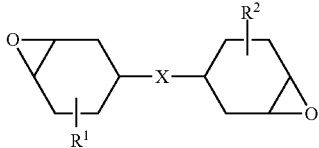

[Chemical Formula 1]

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

4. A preparation method of a hard coating film, the method comprising:
applying the composition of claim 1 on a substrate;
irradiating the applied composition with ultraviolet rays; and
thermally curing the composition irradiated with ultraviolet rays to form a cured hard coating layer.

5. The preparation method of a hard coating film of claim 4, wherein the epoxy siloxane resin has a weight average molecular weight of 1,000 to 20,000.

6. The preparation method of a hard coating film of claim 4, wherein the compound having an alicyclic epoxy group is represented by the following Chemical Formula 1:

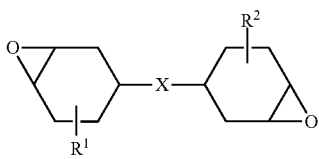

[Chemical Formula 1]

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

7. The preparation method of a hard coating film of claim 4, wherein the thermally curing is carried out at a temperature of 100 to 200° C. for 5 to 20 minutes.

8. The preparation method of a hard coating film of claim 4, further comprising: pretreating the composition by heating before the ultraviolet irradiation.

9. The preparation method of a hard coating film of claim 8, wherein the pretreating is carried out at lower temperature than the thermal curing temperature.

10. The preparation method of a hard coating film of claim 4, further comprising:
further applying the composition to a surface of the substrate on which the cured hard coating layer is not formed; and
ultraviolet-curing the further applied composition to form a photocured hard coating layer.

11. The preparation method of a hard coating film of claim 10, wherein a thickness ratio of the cured hard coating layer to the photocured hard coating layer is 1.1:1 to 8:1.

12. A hard coating film comprising:
a substrate; and
a cured hard coating layer formed by curing the composition of claim 1 on the substrate.

13. The hard coating film of claim 12, wherein the compound having an alicyclic epoxy group is represented by the following Chemical Formula 1:

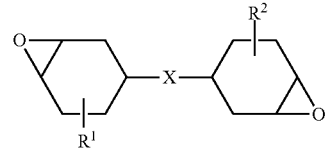

[Chemical Formula 1]

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

14. The hard coating film of claim 12, further comprising: a photocured hard coating layer formed by photocuring the composition on a surface of the substrate on which the cured hard coating layer is not formed.

15. The hard coating film of claim 14, wherein a thickness ratio of the cured hard coating layer to the photocured hard coating layer is 1.1:1 to 8:1.

16. The hard coating film of claim 12, wherein the hard coating film has a curl amount of 5 mm or less, in which the curl amount is measured at each vertex of a square sample cut so that the length of each side is 10 cm and each side is inclined at an angle of 45° to an MD direction of the film.

* * * * *